United States Patent
Pan et al.

(10) Patent No.: US 8,480,531 B2
(45) Date of Patent: Jul. 9, 2013

(54) DIFFERENTIAL ASSEMBLY WITH INVERTED BEARING

(75) Inventors: Jaw-Ping Pan, Lake Orion, MI (US); David Platner, Shelby, MI (US); Hussein Maher Kalaoui, Troy, MI (US); Jack R. McKenzie, Clarkston, MI (US)

(73) Assignee: Arvinmeritor Technology, LLC, Troy, MI (US)

( * ) Notice: Subject to any disclaimer, the term of this patent is extended or adjusted under 35 U.S.C. 154(b) by 1600 days.

(21) Appl. No.: 11/701,812

(22) Filed: Feb. 2, 2007

(65) Prior Publication Data

US 2008/0188343 A1    Aug. 7, 2008

(51) Int. Cl.
 *F16H 48/06* (2006.01)
(52) U.S. Cl.
 USPC .......................... 475/230; 74/606 R
(58) Field of Classification Search
 USPC ................................ 384/521, 559
 See application file for complete search history.

(56) References Cited

U.S. PATENT DOCUMENTS

| | | | |
|---|---|---|---|
| 805,740 A | 11/1905 | Lowe | |
| 904,774 A | 11/1908 | Gulick | |
| 1,076,560 A | 10/1913 | Duffy | |
| 1,106,149 A | 8/1914 | Loomis | |
| 1,471,915 A | 10/1923 | Page | |
| 2,219,025 A | 10/1940 | Vanderberg | |
| 3,131,578 A | 5/1964 | Elliott | |
| 3,448,635 A * | 6/1969 | Nelson | 475/160 |
| 3,770,994 A * | 11/1973 | Smith | 384/583 |
| 4,157,045 A * | 6/1979 | Suzuki | 475/160 |
| 4,543,853 A | 10/1985 | Von Hiddessen et al. | |
| 4,733,578 A | 3/1988 | Glaze | |
| 4,793,211 A * | 12/1988 | Schmidt | 475/246 |
| 4,893,525 A * | 1/1990 | Gabor | 475/241 |
| 4,959,043 A * | 9/1990 | Klotz et al. | 475/230 |
| 5,046,870 A * | 9/1991 | Ordo | 384/563 |
| 5,806,371 A * | 9/1998 | Hibbler et al. | 74/409 |
| 6,200,241 B1 | 3/2001 | Pinotti | |
| 6,203,464 B1 | 3/2001 | Ishikawa | |
| 6,474,873 B1 | 11/2002 | Krisher et al. | |
| 6,705,965 B2 | 3/2004 | Sullivan | |
| 6,813,972 B2 * | 11/2004 | Guo | 74/606 R |

FOREIGN PATENT DOCUMENTS

| | | |
|---|---|---|
| EP | 0221862 | 5/1987 |
| EP | 1028273 | 8/2000 |
| EP | 1028273 A2 * | 8/2000 |

(Continued)

OTHER PUBLICATIONS

Prior art ArvinMeritor configurations—2 pages.

(Continued)

*Primary Examiner* — Justin Holmes
(74) *Attorney, Agent, or Firm* — Brooks Kushman P.C.

(57) ABSTRACT

A differential includes first and second case members that are attached to each other to define an inner cavity that receives a differential gear assembly. A first tapered roller bearing is associated with the first case member and a second tapered roller bearing is associated with the second case member. One of the first and second tapered roller bearings is inverted such that a defining taper diverges towards the differential gear assembly. The other of the first and second tapered roller bearings is non-inverted with a defining taper diverging in a direction that faces away from the differential gear assembly.

18 Claims, 5 Drawing Sheets

FOREIGN PATENT DOCUMENTS

| | | |
|---|---|---|
| JP | 60001420 | 1/1985 |
| JP | 9184564 | 7/1997 |
| JP | 2000052943 | 2/2000 |
| WO | 00/37830 | 6/2000 |

OTHER PUBLICATIONS

European Search Report dated Aug. 5, 2008.

* cited by examiner

DIFFERENTIAL ASSEMBLY WITH INVERTED BEARING

TECHNICAL FIELD

A differential assembly is configured to include an inverted tapered roller bearing associated with one differential case half.

BACKGROUND OF THE INVENTION

A traditional differential assembly includes a first differential case half, a second differential case half, and a ring gear that are attached to each other to form a differential unit. A differential gear assembly is enclosed within a cavity formed within the first and second differential case halves. The first and second differential case halves are often referred to as a plain case half and a flange-side case half. A first tapered roller bearing is mounted to the flange-side case half and second tapered roller bearing is mounted to the plain case half.

The differential unit is installed into a carrier associated with a drive axle. Each of the first and second differential case halves includes a bearing journal that accepts a tapered roller bearing cone for the first and second tapered roller bearings. Bores in the carrier accept corresponding tapered roller bearing cups. The first and second tapered roller bearings are oriented such that an apex of each taper points in a direction away from the differential gear assembly.

One disadvantage with this traditional configuration concerns the first tapered roller bearing, which is associated with the flange-side case half. Packaging constraints prevent this flange-side bearing from favorably straddling gear forces, e.g. the flange-side bearing is positioned such that the flange-side bearing reacts most of the load from gear forces. This is especially true for a tandem axle configuration where a through-shaft, which transfers driving input to a rear-rear axle, passes through a hollow pinion input gear. To accommodate these high reaction forces, a large, high-cost bearing is required in order to meet durability requirements. The large reaction forces also result in high stress levels on a flange-side bearing journal. These stress levels in turn drive the need for more expensive differential case materials and/or expensive processing steps (induction hardening, for example) in order to meet durability requirements. This adds further cost to the product.

Another disadvantage with the traditional configuration is that assembly of the differential assembly into the carrier is highly constrained due to requirement of a one-piece flange-side bearing support. The one-piece flange-side bearing support is required because a two piece leg cap cannot package inside the available space. To assemble the differential assembly into the carrier, the differential assembly must be swung through an opening in a carrier housing such that the flange-side bearing and cone can be fitted into an associated cup. Sufficient clearances must be incorporated into the carrier housing to allow for the differential assembly to be installed without contacting any carrier structures. This increases the weight and cost of the carrier and increases the volume of the lubricant required.

Thus, there is a need for an improved differential configuration that facilitates assembly, reduces cost, and more evenly distributes gear loading, as well as overcoming other above-mentioned deficiencies in the prior art.

SUMMARY OF THE INVENTION

A differential includes first and second case members that are attached to each other to provide an internal cavity that receives a differential gear assembly. A first bearing is associated with the first case member and a second bearing is associated with the second case member. The first and second bearings are tapered roller bearings with one of the bearings being installed in an inverted position where a defining taper extends in a direction facing the differential gear assembly.

In one example, the first case member is a plug case half and the second case member is a plain case half. A first tapered roller bearing is installed on the plug case half and is inverted such that an apex of the defining taper points towards the differential gear assembly. A second tapered roller bearing is installed on the plain case half and is non-inverted such that an apex of a defining taper points in a direction facing away from the differential gear assembly.

In this configuration, the plug case half includes a bore that accepts a bearing cup. A trunnion, mounted to a carrier housing, includes a journal feature that accepts the bearing cone for the first tapered roller bearing. The plain case half includes an outer circumferential surface that accepts a bearing cone. The carrier housing provides support for another bore that accepts the bearing cup for the second tapered roller bearing.

This configuration facilitates assembly of the differential into a carrier by requiring smaller swing clearances compared to traditional configurations. This feature reduces carrier size, weight, and cost as well as reducing required lubricant volume. The bearing cup for the first tapered roller bearing is installed within the bore of the plug case half and the bearing cone for the second tapered roller bearing is installed onto the outer circumferential surface of the plain case half to form a bearing and differential case unit. The bearing and differential case unit is then inserted into the internal cavity by rotating, i.e. swinging, the bearing and differential case unit through an opening in the carrier such that the bearing cup surrounds the bearing cone of the first tapered roller bearing.

The configuration also provides easy setting and adjustment of gear backlash and bearing preloads. In one embodiment, one of the first and second tapered roller bearings is shimmed to adjust gear backlash, and a single adjusting ring, located at the plain case half, is adjusted to adjust bearing preload. The single adjusting ring has the advantage of being able to set and adjust bearing preloads for both the first and second tapered roller bearings.

These and other features of the present invention can be best understood from the following specification and drawings, the following of which is a brief description.

DETAILED DESCRIPTION OF THE PREFERRED EMBODIMENT

Figure 1:
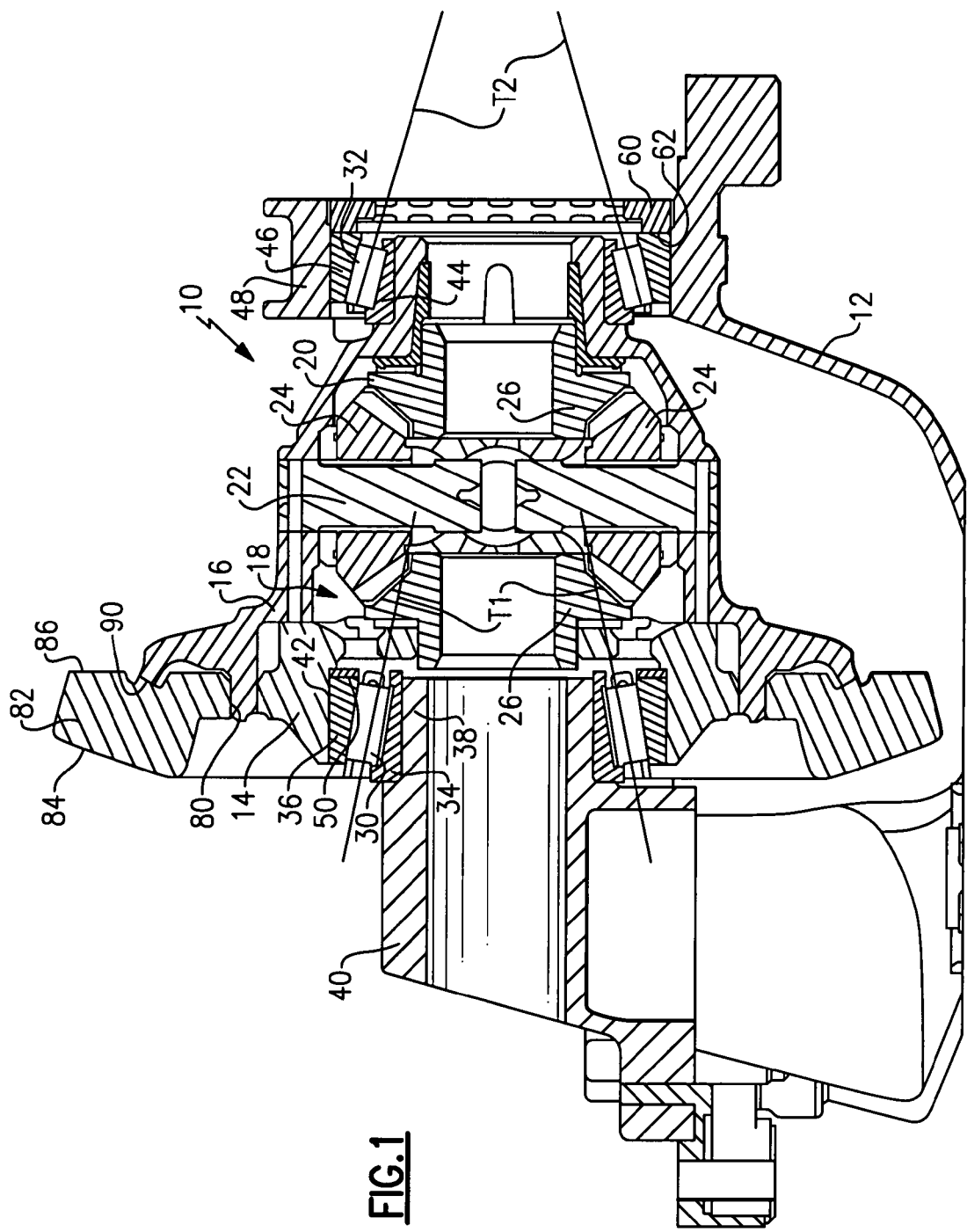
FIG. 1 shows a cross-sectional view of a differential assembly installed within a carrier housing.

A differential assembly 10 is installed within a carrier housing 12 as shown in FIG. 1. The differential assembly 10 cooperates with first and second axle shafts (not shown) as known to drive wheels of a drive axle. The differential assembly 10 is comprised of two case halves, a plug case half 14 and a plain case half 16. The plug case half 14 and plain case half 16 are fixed together and provide a cavity 18 that receives a differential gear assembly 20.

The differential gear assembly 20 includes a spider 22 that is fixed to the plain case half 16. The spider can be comprised of three separate pins, or the spider could be formed as a single cross. Four differential gears 24 are supported on four legs of the spider 22 (only two are shown in the view of FIG. 1). The differential gear assembly 20 also includes first and second side gears 26 that drive the first and second axle shafts, respectively. The operation of the differential gear assembly 20 to differentiate rotational speeds of the axle shafts under certain conditions is known and will not be discussed in further detail.

A first tapered roller bearing 30 is associated with the plug case half 14 and a second tapered roller bearing 32 is associated with the plain case half 16. The first tapered roller bearing 30 is installed in an inverted position such that that an apex of the defining taper T1 points towards the differential gear assembly 20. The second tapered roller bearing 32 is installed in a non-inverted position such that an apex of the defining taper T2 points in a direction away from the differential gear assembly 20. This configuration of tapers T1, T2 more evenly distributes gear loading and facilitates assembly and adjustment. This will be discussed in greater detail below.

The first tapered roller bearing 30 includes a first bearing cone 34 and a first bearing cup 36. The first bearing cone 34 is fitted onto a bearing journal 38 of a trunnion 40. The trunnion 40 is mounted to the carrier housing 12. The first bearing cup 36 is mounted within an internal bore 42 of the plug case half 14.

The second tapered roller bearing 32 includes a second bearing cone 44 and a second bearing cup 46. The second bearing cone 44 is mounted on the plain case half 16. The second bearing cup 46 is fitted on a bearing journal formed within a leg cap 48. The leg cap 48 is mounted to the carrier housing 12.

At least one shim 50 is mounted within the differential assembly 10 to adjust gear backlash. In the example shown, the shim 50 is mounted between an end of the first tapered roller bearing 36 and the plug case half 14. Only one shim 50 may be required, or additional shims 50 could be added as needed, to set a desired backlash. The shims 50 could optionally be associated with the first tapered roller bearing cone 34, and the trunnion 40 or shims 50 could be used with both the first tapered roller cup 36 and cone 34.

A single adjusting ring 60 is used to set and/or adjust bearing preload. The adjusting ring 60 is positioned on a plain case side of the differential gear assembly 20 opposite from the plug case half 14. The adjusting ring 60 is threaded or otherwise attached to the leg cap 48 and includes an abutment surface 62 that engages an end of the second tapered roller bearing cup 46. Bearing preload is set and/or adjusted by rotating the adjusting ring 60 as known. The advantage with this configuration is that a single adjusting ring 60 can be used to adjust preload for both the first 30 and second 32 tapered roller bearings. Rotating the adjusting ring 60 against the second tapered roller bearing 32 adjusts the preload on the first 30 and second 32 tapered roller bearings via interaction with the plug case half 14 and plain case half 16.

Figure 2B:
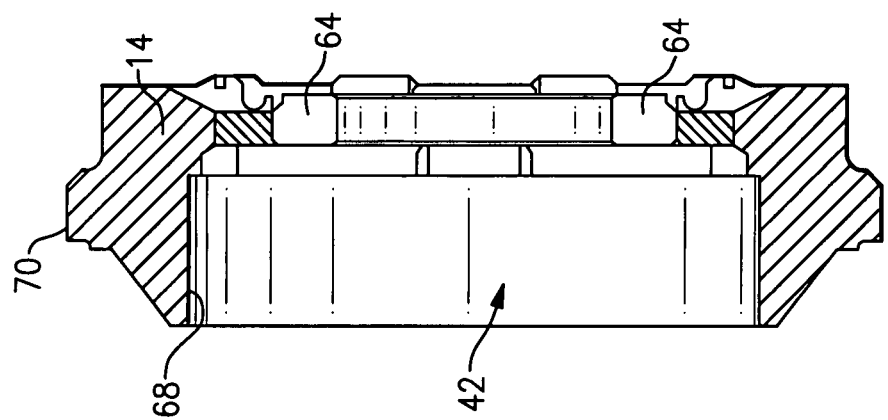
FIG. 2B shows a cross-sectional view of the plug case half of FIG. 2A.
Figure 2A:
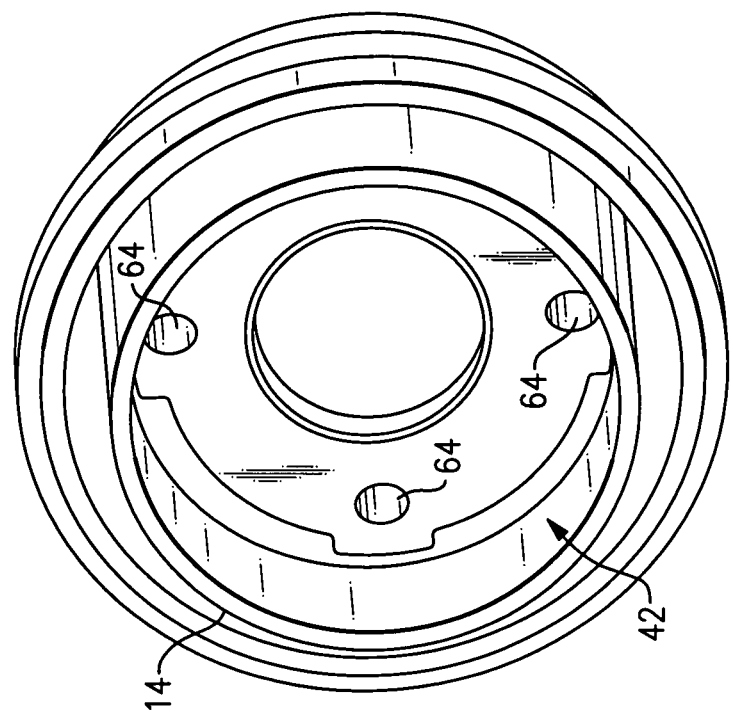
FIG. 2A shows a perspective view of a plug case half of the differential assembly of claim 1.
Figure 3B:
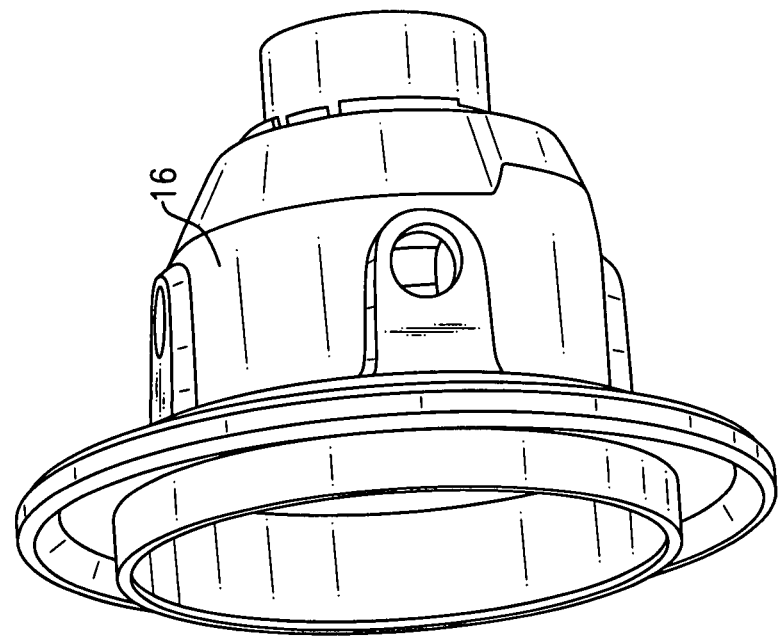
FIG. 3B shows a perspective view of the plain case half of FIG. 3A.
Figure 3A:
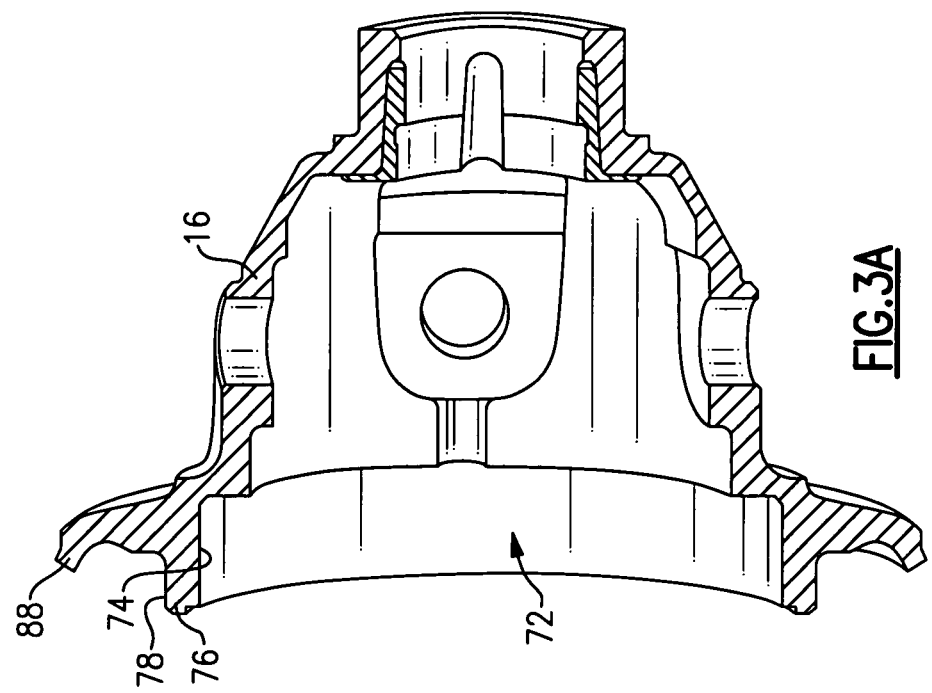
FIG. 3A shows a cross-sectional view of a plain case half of the differential assembly of claim 1.

The plug case half 14 is shown in greater detail in FIGS. 2A and 2B, and the plain case half 16 is shown in greater detail in FIGS. 3A and 3B. A plurality of lubrication holes 64 is formed within the plug case half 14 to provide lubrication to the first tapered roller bearing 30. Lubricant flows from the inside of a plug case half cavity to the first tapered roller bearing 30 through the lubrication holes 64. This is necessary because the first tapered roller bearing 30 pumps lubricant from a small end to a large end of the taper. If the first tapered roller bearing 30 does not receive oil through this lubrication hole 64, the small end may be starved of lubricant. The plug case half 14 includes the internal bore 42 with an inner circumferential surface 68 that receives the first bearing cup 36. The plug case half 14 includes an outer circumferential surface 70 that is received within a cavity 72 formed within the plain case half 16.

The cavity 72 of the plain case half 16 includes an inner circumferential surface 74 that abuts directly against the outer circumferential surface 70 of the plug case half 14. The plain case half 16 includes a first outer circumferential portion 76 that defines an outer circumferential surface 78. This outer circumferential surface 78 directly abuts against an inner circumferential surface 80 of a ring gear 82 (FIG. 1).

The ring gear 82 is driven by an input pinion (not shown), which receives driving input from a vehicle power source as known. The ring gear 82 includes a front side 84 with a plurality of ring gear teeth and a rear side 86 opposite from the front side 84. The plain case half 16 includes a second outer circumferential portion 88 that abuts against an attachment feature 90 formed on the rear side 86 of the ring gear 82.

The ring gear 82, plug case half 14, and the plain case half 16 are all fixed together as a unit. In the example shown, the plain case half 16 is welded to the ring gear 82 at the attachment feature 90; and the plug case half 14 and plain case half 16 are welded together at an interface between the outer circumferential surface 70 of the plug case half 14 and the inner circumferential surface 74 of the plain case half 16. It should be understood that while weld interfaces are shown, other attachment methods and/or fastening apparatuses could be used to secure the ring gear 82, plug case half 14, and the plain case half 16 together.

Figure 4:
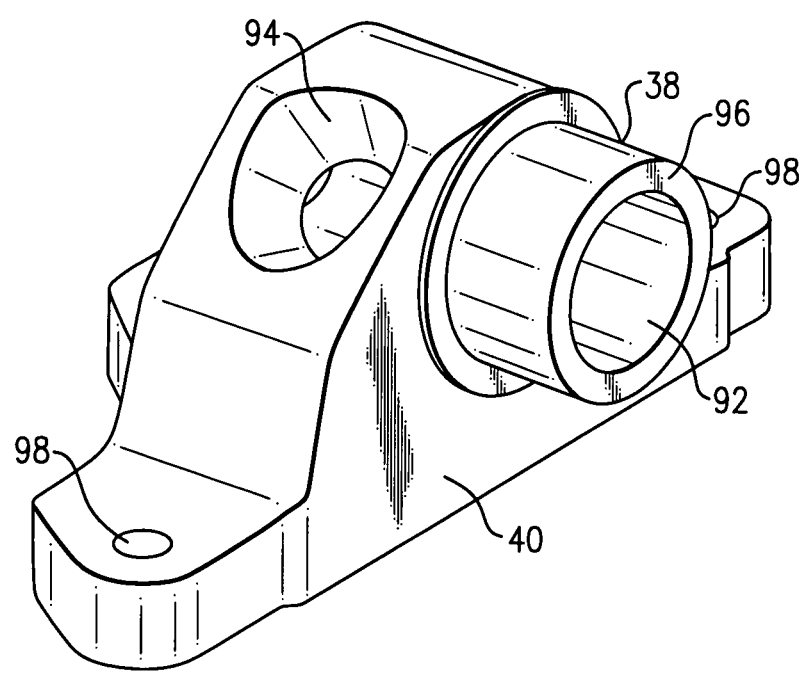
FIG. 4 shows a trunnion mounted within the carrier housing shown in FIG. 1.
Figure 5A:
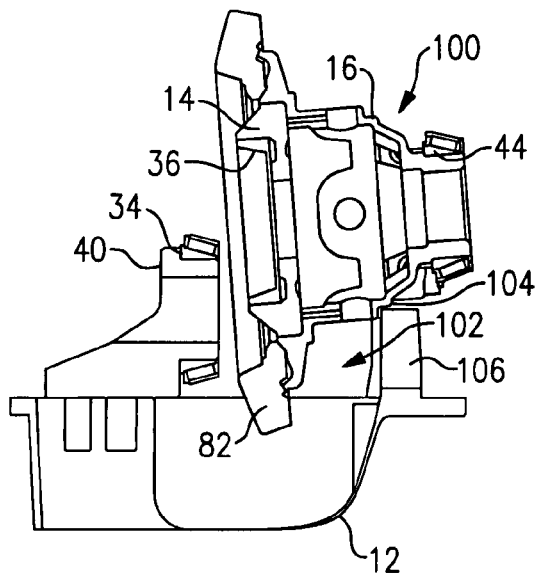
FIG. 5A shows the differential assembly of FIG. 1 in a first installation position.
Figure 5B:
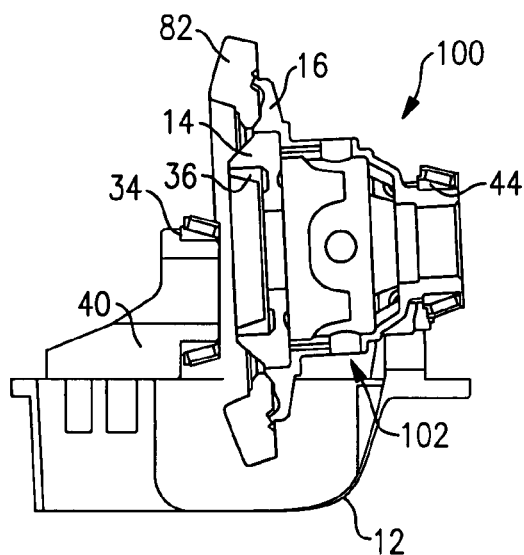
FIG. 5B shows the differential assembly of FIG. 5A in a subsequent installation position.
Figure 5C:
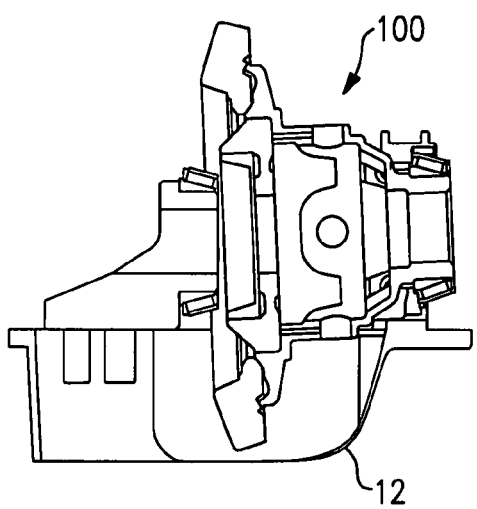
FIG. 5C shows the differential assembly of FIG. 5B in a subsequent installation position.
Figure 5D:
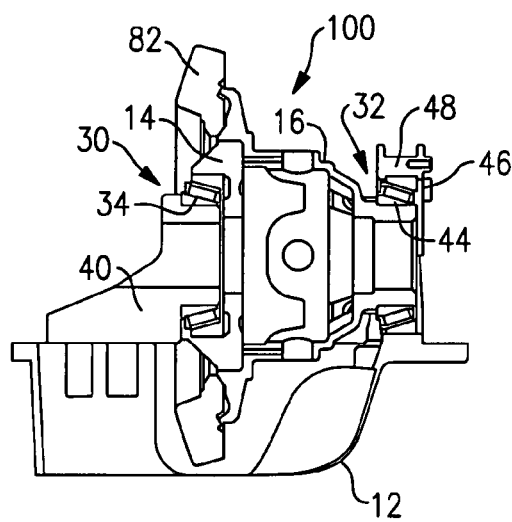
FIG. 5D shows the differential assembly of FIG. 5C in a final installation position.

The trunnion 40 is shown in greater detail in FIG. 4. The trunnion 40 includes mounting ears 98 for attachment to the carrier housing 12. The trunnion 40 also includes a first internal bore 92 for receiving one of the axle shafts and a second internal bore 94 that receives the through-shaft (not shown). The through-shaft transfers driving input to a rear-rear axle of a tandem drive axle as known. The trunnion 40 includes a tubular extension 96 that defines the bearing journal 38 that receives the first tapered roller bearing 30.

This differential configuration facilitates assembly of the differential assembly 10 into the carrier housing 12. As shown in FIGS. 5A-D, the first bearing cup 36 is installed within the inner bore 42 of the plug case half 14 and the second bearing cone 44 is installed on an outer circumferential surface of the plain case half 16. This results in a bearing and differential case unit, as indicated at 100. This unit 100 is rotated or swung through an opening 102 within the carrier housing 12. The carrier housing 12 is configured such that a minimal clearance at 104 is required such that the plain case half 16 does not contact a wall portion 106 that partially defines the opening 102.

As shown in FIGS. 5A-5D, the trunnion 40 is mounted to the carrier housing 12 and supports the first bearing cone 34. The bearing and differential case unit 100 is swung into the opening 102 in the carrier housing 12 such that the first bearing cup 36 surrounds the first bearing cone 34 (see FIGS. 5C-5D). The leg cap 48, which is mounted to the carrier housing 12, receives the second bearing cup 46. When fully installed, the second bearing cup 46 surrounds the second bearing cone 44 (see FIG. 5D).

The differential assembly 10 with the inverted bearing (first tapered roller bearing 30) as described above, results in the effective center of the first tapered roller bearing 30 being located further away from the second tapered roller bearing 32 than in a traditional configuration. This effectively increases the bearing spread, which significantly lowers loading on the first tapered roller bearing 30. As such, smaller, lower cost bearings can be used at this location. Loads on the bearing journal 38 are also lowered, such that lower cost materials and/or additional material processing steps are no longer required for the bearing journal 38. Thus, a differential assembly 10 with the inverted bearing described above is easier to assemble and more evenly distributes gear loading, which results in improved durability and reduced cost.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A differential assembly comprising:
   a first differential case member;
   a second differential case member mounted to said first differential case member to provide a cavity for receiving a differential gear assembly;
   a first tapered roller bearing associated with said first differential case member and defined by a first taper that diverges in a direction facing the differential gear assembly;
   a second tapered roller bearing associated with said second differential case member and defined by a second taper that diverges in a direction that faces away from the differential gear assembly;
   at least one shim positioned on one side of the differential assembly;
   a single adjusting ring positioned on an opposite side of the differential assembly from said at least one shim, said single adjusting ring being adjustable to set a bearing preload for both said first and said second tapered roller bearings.

2. The differential assembly according to claim 1 wherein said first differential case member comprises a plug case half and said second differential case comprises a plain case half that receives said plug case half such that an outer circumferential surface of said plug case half is surrounded by an inner circumferential surface of said plain case half.

3. The differential assembly according to claim 2 including a ring gear mounted to said plain case half.

4. The differential assembly according to claim 3 wherein said outer circumferential surface of said plug case half abuts directly against said inner circumferential surface of said plain case half, and wherein said plain case half includes an outer circumferential surface that abuts directly against an inner circumferential surface of said ring gear.

5. The differential assembly according to claim 4 wherein said ring gear includes a front side with a plurality of ring gear teeth and a rear side opposite said front side, and wherein said plain case half includes an extension portion that contacts an attachment feature on said rear side of said ring gear.

6. The differential assembly according to claim 2 including a trunnion mounted to a carrier housing wherein said first tapered roller bearing includes a first bearing cone that is received on a first bearing journal formed on said trunnion.

7. The differential assembly according to claim 6 wherein said trunnion includes an internal bore to receive a first axle shaft, a through-shaft bore, and a tubular extension portion that forms said first bearing journal and which has an outer surface that receives said first bearing cone.

8. The differential assembly according to claim 7 wherein said plain case half includes an opening to receive a second axle shaft for rotation about an axis of rotation and an outer surface extending about said axis of rotation, and wherein said second tapered roller bearing includes a second bearing cone that is received on said outer surface.

9. The differential assembly according to claim 8 wherein said second tapered roller bearing includes a second bearing cup that is received in a bearing bore supported by the carrier housing.

10. The differential assembly according to claim 9 wherein said bearing bore comprises a leg cap mounted to the carrier housing, said leg cap including an inner circumferential surface that receives said second bearing cup.

11. The differential assembly according to claim 2 wherein said plug case half includes at least one lubrication channel to convey lubricating fluid to said first tapered roller bearing.

12. The differential assembly according to claim 1 wherein said first differential case member comprises a plug case half and said second differential case member comprises a plain case half fixed to said plug case half, and wherein said at least one shim is positioned axially between an end of said first tapered roller bearing cup and said plug case half to adjust gear backlash.

13. The differential assembly according to claim 1 wherein said first differential case member comprises a plug case half and said second differential case member comprises a plain case half fixed to said plug case half, and wherein said single adjusting ring is positioned on a plain case side of the differential assembly opposite from said plug case half.

14. A method of assembling a differential into a carrier comprising the steps of:
   (a) providing a first tapered roller bearing having a first bearing cup and a first bearing cone, and providing a second tapered roller bearing having a second bearing cup and a second bearing cone;
   (b) installing the first bearing cup within an inner bore of a first differential case member and installing the second bearing cone on an outer circumferential surface of a second differential case member to provide a bearing and differential case unit, and wherein the first and second differential case members support a differential gear assembly, and including defining the first tapered roller bearing by a first taper having an apex that diverges in a direction toward the differential gear assembly and defining the second tapered roller bearing by a second taper having an apex that diverges in a direction away from the differential gear assembly;
   (c) providing a carrier housing having an internal cavity for receiving the bearing and differential case unit, the carrier housing including a trunnion that supports the first bearing cone;
   (d) inserting the bearing and differential case unit into the internal cavity by rotating the bearing and differential case unit through an opening in the carrier housing such that the first bearing cup surrounds the first bearing cone; and (e) associating at least one shim with one of the first and second differential case members and associating a single adjusting ring with the other of the first and second differential case members, and including adjusting the single adjusting ring to set a desired bearing preload for both the first and second tapered roller bearings.

15. The method according to claim 14 including providing a leg cap mounted to the carrier housing, installing the second bearing cup within the leg cap, and surrounding the second bearing cone with the second bearing cup.

16. A method for adjusting a differential assembly comprising the steps of:

(a) providing a plain case half and a plug case half to be secured together to define a cavity for receiving a differential gear assembly;

(b) associating a first bearing with the plug case half and associating a second bearing with the plain case half;

(c) positioning a single adjusting ring on a plain case side of the differential gear assembly, opposite from a plug case half;

(d) positioning at least one shim within the plug case half near the first bearing; and (e) adjusting the single adjusting ring to set bearing preloads for both the first and second bearings.

17. The method according to claim 16 wherein the first and second bearings comprise first and second tapered roller bearings and including defining the first tapered roller bearing with a taper having an apex that diverges in a direction toward the differential gear assembly and defining the second tapered roller bearing with a taper having an apex that diverges in a direction away from the differential gear assembly.

18. The method according to claim 16 including installing said at least one shim between the first bearing and the plug case half to adjust gear backlash.

* * * * *